Patented Oct. 9, 1951

2,570,492

UNITED STATES PATENT OFFICE 2,570,492

DRILLING FLUIDS AND METHODS OF USING SAME

Virgil Scarth, Bartlesville, Okla., assignor to Phillips Petroleum Company, a corporation of Delaware No Drawing. Application February 17, 1949,
Serial No. 77,054

33 Claims. (Cl. 252—8.5)

1

This invention relates to water base drilling muds containing water soluble ethyl sulfoethyl cellulose. In a more specific aspect, it relates to a water base drilling mud containing a water soluble ethyl sulfoethyl cellulose selected from the group consisting of ethyl sulfoethyl cellulose and the water soluble salts thereof. In some aspects it relates to drilling fluids suitable for drilling in heaving shale. In still other aspects, it relates to drilling fluids having a high salt content, due either to deliberate addition of salt, or due to contamination of the mud with salt from natural formations or from connate waters. It also relates to methods of drilling or controlling wells with such fluids.

In the art of drilling wells, especially drilling by the rotary method, it is necessary to use a drilling mud, as is well understood in the art. The drilling mud lubricates the drill stem, carries the cuttings to the surface of the well, and forms a filter cake on the walls of the well preventing loss of at least any substantial amount of water from the drilling mud to the natural formations penetrated. In order to perform these important functions properly, the drilling mud must have suitable viscosity and other qualities at all times in spite of adverse conditions encountered in drilling the well.

In drilling wells there are two major difficulties caused by natural formations penetrated. The first of these difficulties is the encountering of salt which will cut ordinary drilling mud so that its viscosity is entirely too high, the clay particles are flocculated, and there is grave danger of the drilling pipe twisting in half or of gas cutting of the mud or of a blowout occurring due to the salt cutting of the mud. The other difficulty is encountered when a formation known as heaving shale is penetrated. Heaving shale absorbs water from the drilling mud and by a caving or disintegration action common to clay and shale, or by a swelling action common to bentonite materials, the well hole is closed around the drill string which chokes off the circulation of drilling mud and often seizes the drill string so that the drill string twists in half.

The principal object of my invention is to produce a drilling mud which can be used in ordinary formations and which will resist contamination by salt and which will not cause heaving shale or similar formations to cave or swell.

2

Another object is to provide an improved drilling mud.

Another object is to provide an improved method of drilling.

A further object is to provide a drilling mud containing a water soluble ethyl sulfoethyl cellulose.

Another object is to provide a drilling mud containing a water soluble ethyl sufoethyl cellulose and/or a salt thereof.

Another object is to provide a suitable method of drilling in ordinary formations, in salt containing formations and in formations tending to cave or heave.

Numerous other objects and advantages of the invention will be apparent to those skilled in the art upon reading the following specification and the accompanying claims.

Operation

In the present invention I prefer to employ as a colloidal suspending agent or dispersing agent in a drilling mud a water soluble ethyl sulfoethyl cellulose. By "water soluble," I mean those ethyl sulfoethyl cellulose compounds that are water dispersible as well as those that form true solutions. In this disclosure, unless otherwise indicated, the term "water soluble ethyl sulfoethyl cellulose" is intended to include the free acid and all of the water soluble salts thereof. Various effective amounts of such material can be employed as even small amounts give a correspondingly smaller effect. I have found in the case of ethyl sodium sulfoethyl cellulose, that six pounds of dry powdered water soluble ethyl sodium sulfoethyl cellulose per 42 gallon barrel gives a satisfactory and economical mixture. However, much less or much more of the material may be employed and still the advantages of my invention will be achieved to a greater or lesser extent.

The water soluble ethyl sulfoethyl cellulose may be in dried powder form, and the particle size may vary over a wide range. However, for rapid solution a particle size where 95% will pass an 80 mesh screen is useful. To speed up the solution of any water soluble ethyl sulfoethyl cellulose, any suitable wetting agent such as alcohol may be added first.

In rotary drilling, the usual method is to add the ethyl sulfoethyl cellulose powder to the drilling fluid flowing in the mud ditch to the pump intake, or to the mud pit, by scattering the powder over the surface. An alternative method would be to make up a more or less concentrated solution of the water soluble ethyl sulfoethyl cellulose and add that in a stream to the drilling mud. In some instances, a pure water solution of water soluble ethyl sulfoethyl cellulose may be used as the well-drilling or well-controlling fluid, but wall-building materials such as clay, kaolin, bentonite and various weighting materials are generally added. The drilling fluid containing the water soluble ethyl sulfoethyl cellulose and water is pumped in circulation or reverse circulation in the drill string or used to fill or partially fill the well in the usual operations of well drilling and well controlling of the prior art. When the water soluble ethyl sulfoethyl cellulose is so used in sufficient amount, a new result is achieved in that salt does not cut the mud enough to ruin it for drilling, and formations exposed to it do not cave or heave enough to stop the drilling. Suitable control or mud treating agents, such as phosphates and/or quebracho, may be used if desired.

Ethyl sulfoethyl cellulose is a mixed ether of cellulose wherein some of the hydroxyl hydrogens are replaced by ethyl groups and others are replaced by sulfoethyl groups. Ordinarily, the alkali metal salts of ethyl sulfoethyl cellulose are preferred for use in drilling mud. However, the ammonium or alkaline earth metal salts or any of the other water soluble inorganic salts, such as the zinc, cobalt, magnesium, manganese, nickel, silver, cadmium, copper, iron, aluminum, tin or mercury salts have degrees of usefulness. By the term "water-soluble," it is meant to include those salts which are soluble or dispersible in the aqueous phase of water-base drilling muds, which may have a pH of 7.0 to 12. Any of the above-named salts which conform to this requirement may be used.

The degree of substitution of sulfoethyl groups in the cellulose molecule may be between 0.1 and 2.95 and the degree of substitution of ethyl groups may be between 0.05 and 2.5. It is necessary that the total degree of substitution be sufficient to form a water soluble molecule whose viscosity will not be inordinately high. Substituting the sulfoethyl groups in the molecule results in the water solubility of the molecule. By replacing a portion of the hydroxyl hydrogens with ethyl groups, the viscosity of a water soluble solution is considerably lowered so that the total degree of substitution of ethyl and sulfoethyl groups is less than that which would be required if the substituents were sulfoethyl groups alone. A cellulose molecule having a degree of substitution of 0.3 to 0.5 sulfoethyl groups and 0.3 to 0.5 of ethyl groups gives excellent results in a drilling mud when used in amounts up to six pounds of ethyl sulfoethyl cellulose per barrel of drilling mud.

The water soluble ethyl sulfoethyl celluloses may be prepared by any of the well-known methods of preparation. The desired salt may be prepared by reacting a base of that salt with the free acid or by using the haloethyl metal sulfonate as the etherifying group in forming the molecule.

Higher degrees of substitution than those previously given may be used effectively but the increase in effectiveness of the more highly etherified molecules over that produced by those within the preferred range is not sufficient to warrant the added cost of producing them.

The mode or theory of operation by which the water soluble ethyl sulfoethyl celluloses protect the surface of clay or bentonite from attack by water is obscure, but it is believed that as the water attempts to enter the clay the ethyl sulfoethyl cellulose forms a layer of a protective material on the outside of the clay or bentonite, preventing absorption of water from the drilling mud.

Drilling muds containing water soluble ethyl sulfoethyl cellulose are not subject to injury by salt to any detrimental degree but may still be useful as drilling muds when there is as much in some instances, as 238,000 or more parts per million of sodium chloride in the drilling mud.

Water soluble ethyl sulfoethyl-cellulose-containing drilling muds often have a low initial gel strength, which allows gas bubbles to come out of the drilling mud so rapidly that the drilling mud will not become gas cut, which, in turn, reduces the chances of blowouts. Water soluble ethyl sulfoethyl cellulose drilling muds are often characterized by a very thin filter cake thickness and by very small water loss or complete absence of water loss. This is very useful in avoiding the swelling or caving of heaving formations. These muds do not generally ferment or spoil. Numerous other advantages of my invention will be apparent from a study of the following representative experiments, which have been selected to show in a minimum of space the advantages of water soluble ethyl sulfoethyl cellulose drilling muds.

The ethyl sulfoethyl cellulose used in the following tests was ethyl sodium sulfoethyl cellulose wherein the degree of substitution of sulfoethyl groups was 0.3 and the degree of substitution of ethyl groups was 0.2. A one per cent aqueous dispersion of this material had a viscosity of 1.5 cps. at 24° C. and a pH of 9.7.

Tests were carried out according to the procedure outlined in A. P. I. 29.

EXAMPLE I

The ethyl sulfoethyl sodium cellulose previously described was tested in a fresh water drilling mud comprising 1.8 per cent bentonite, 18.0 per cent kaolin, 17.5 per cent barium sulfate, and 62.7 per cent of water. To portions of this base mud were added amounts of the cellulosic material equivalent to 1, 2, 4, and 6 pounds of ethyl sodium sulfoethyl cellulose per barrel to drilling mud. The results were as follows:

*Table 1*

| Additive, lb./bbl. | Stormer Viscosity, 600 R. P. M., cps. | Gel Strength (g.) | | 30 min. Water Loss, ml. | Mud, pH |
|---|---|---|---|---|---|
| | | Initial | 10 min. | | |
| 0 | 11 | 0 | 0 | 19.0 | 7.9 |
| 1 | 16 | 0 | 0 | 9.8 | 8.0 |
| 2 | 25 | 0 | 0 | 7.2 | 7.9 |
| 4 | 41 | 0 | 0 | 4.7 | 7.9 |
| 6 | 50 | 0 | 5 | 3.2 | 8.2 |

TABLE II

The previously described ethyl sodium sulfoethyl cellulose was tested by adding the following indicated equivalent amounts to portions of a high calcium base mud comprising 0.8 per cent bentonite, 8.0 per cent Ezmix (a native Texas clay), 0.17 per cent calcium sulfate, 26.20 per cent barium sulfate, and 64.83 per cent water. The results were as indicated in the following table:

Table 2

| Additive, lb./bbl. | Stormer Viscosity, 600 R.P.M., cps. | Gel Strength (g.) | | 30 min. Water Loss, ml. | Mud, pH |
|---|---|---|---|---|---|
| | | Initial | 10 min. | | |
| 0 | 16.5 | 20 | 20 | 56 | 7.9 |
| 1 | 5 | 5 | 7 | 53.5 | 8.0 |
| 2 | 4.5 | 0 | 0 | 35 | 8.0 |
| 4 | 8 | 0 | 0 | 13 | 8.0 |
| 6 | 8.5 | 0 | 0 | 6.5 | 8.1 |

EXAMPLE III

To test the resistance of my drilling muds to sodium chloride contamination, tests were run using a base mud to which had been added at least 50,000 parts per million of sodium chloride. The base mud comprised 0.8 per cent bentonite, 18.0 per cent kaolin, 8.0 per cent Ezmix, 0.17 per cent calcium sulfate, 26.20 per cent barium sulfate, and 64.83 per cent water, the sodium chloride being added to the water phase. The results of this test were as shown in the following table.

Table 3

| Additive, lb./bbl. | Stormer Viscosity, 600 R.P.M., cps. | Gel Strength (g.) | | API Water Loss, ml. | Mud, pH |
|---|---|---|---|---|---|
| | | Initial | 10 min. | | |
| [1] 0 | 11 | 15 | 15 | 64 | 7.9 |
| 0 | 12 | 15 | 17 | 64 | 7.9 |
| 1 | 5 | 3 | 5 | 65 | 7.9 |
| 2 | 9 | 0 | 30 | 52 | 7.9 |
| 4 | 5 | 0 | 0 | 25 | 7.9 |
| 6 | 7 | 0 | 0 | 6.8 | 8.0 |

[1] This was a sample of base mud before the addition of sodium chloride.

The above simple experiments are merely representative and are given to show how water soluble ethyl sulfoethyl cellulose may be used in water base drilling muds by those skilled in the art and are not to be considered as unduly limiting my invention.

It is to be understood that while a theory of operation has been advanced, it is not the only or necessary one, but has only been advanced to facilitate the disclosure and this invention is not limited to any theory of operation or action. It is to be understood that the invention is not to be limited to the specific details described. For example, the tests with treating and control agents indicate that water soluble ethyl sulfoethyl celluloses are somewhat inert chemically and that all the treating and control agents of the well drilling fluid and well controlling fluid arts may, after a simple test for solubility and lack of obvious adverse reaction, be employed without invention in my water soluble ethyl sulfoethyl cellulose drilling and controlling fluids. My invention is, therefore, defined by the following claims.

Having described my invention, I claim:

1. A water base well drilling mud comprising, in combination, sufficient water to maintain the mud as a fluid, sufficient clayey material to form a filter cake on the wall of the well, and a water soluble ethyl sulfoethyl cellulose selected from the group consisting of ethyl sulfoethyl cellulose and the water soluble salts thereof in an amount sufficient to reduce the water loss due to filtration through said filter cake without increasing the viscosity of said well drilling mud to such an extent that it cannot be circulated.

2. A water base well drilling mud comprising, in combination, sufficient water to maintain the mud as a fluid, sufficient clayey material to form a filter cake on the wall of the well, and a water soluble ethyl sodium sulfoethyl cellulose in an amount sufficient to reduce the water loss due to filtration through said filter cake without increasing the viscosity of said well drilling mud to such an extent that it cannot be circulated.

3. A water base well drilling mud comprising, in combination, sufficient water to maintain the mud as a fluid, sufficient clayey material to form a filter cake on the wall of the well, and a water soluble ethyl ammonium sulfoethyl cellulose in an amount sufficient to reduce the water loss due to filtration through said filter cake without increasing the viscosity of said well drilling mud to such an extent that it cannot be circulated.

4. A water base well drilling mud comprising, in combination, sufficient water to maintain the mud as a fluid, sufficient clayey material to form a filter cake on the wall of the well, and a water soluble ethyl magnesium sulfoethyl cellulose in an amount sufficient to reduce the water loss due to filtration through said filter cake without increasing the viscosity of said well drilling mud to such an extent that it cannot be circulated.

5. A water base well drilling mud comprising an aqueous fluid mixture containing suspended inorganic solids which form a filter cake on the wall of the well and a water soluble ethyl sulfoethyl cellulose selected from the group consisting of ethyl sulfoethyl cellulose and the water soluble inorganic salts thereof in an amount sufficient to reduce the water loss due to filtration through said filter cake without increasing the viscosity of said well drilling fluid to such an extent that it cannot be circulated.

6. A water base well drilling mud comprising an aqueous fluid mixture containing suspended inorganic solids which form a filter cake on the wall of the well and a water soluble ethyl sodium sulfoethyl cellulose in an amount sufficient to reduce the water loss due to filtration through said filter cake without increasing the viscosity of said well drilling mud to such an extent that it cannot be circulated.

7. A water base well drilling mud comprising an aqueous fluid mixture containing suspended inorganic solids which form a filter cake on the wall of the well and a water soluble ethyl ammonium sulfoethyl cellulose in an amount sufficient to reduce the water loss due to filtration through said filter cake without increasing the viscosity of said well drilling mud to such an extent that it cannot be circulated.

8. A water base well drilling mud comprising an aqueous fluid mixture containing suspended inorganic solids which form a filter cake on the wall of the well and a water soluble ethyl magnesium sulfoethyl cellulose in an amount sufficient to reduce the water loss due to filtration through said filter cake without increasing the viscosity of said well drilling mud to such an extent that it cannot be circulated.

9. A water base well drilling mud comprising, in combination, sufficient water to maintain the mud as a fluid, sufficient clayey material to form a filter cake on the wall of the well, and a water soluble ethyl sulfoethyl cellulose compound selected from the group consisting of ethyl sulfoethyl cellulose, ethyl alkali metal sulfoethyl cellulose, ethyl alkaline earth metal sulfoethyl cellulose, and ethyl ammonium sulfoethyl cellulose in an amount sufficient to reduce the water loss due to filtration through said filter cake without increasing the viscosity of said well drilling mud to such an extent that it cannot be circulated.

10. A water base well drilling mud comprising, in combination, sufficient water to maintain the mud as a fluid, sufficient clayey material to form a filter cake on the wall of the well, and a water soluble ethyl alkali metal sulfoethyl cellulose in an amount sufficient to reduce the water loss due to filtration through said filter cake without increasing the viscosity of said well drilling mud to such an extent that it cannot be circulated.

11. A water base well drilling mud comprising, in combination, sufficient water to maintain the mud as a fluid, sufficient clayey material to form a filter cake on the wall of the well, and a water soluble ethyl alkaline earth metal sulfoethyl cellulose in an amount sufficient to reduce the water loss due to filtration through said filter cake without increasing the viscosity of said well drilling mud to such an extent that it cannot be circulated.

12. A water base well drilling mud comprising, in combination, sufficient water to maintain the mud as a fluid, sufficient clayey material to form a filter cake on the wall of the well, and a water soluble ethyl potassium sulfoethyl cellulose in an amount sufficient to reduce the water loss due to filtration through said filter cake without increasing the viscosity of said well drilling mud to such an extent that it cannot be circulated.

13. A water base well drilling mud comprising, in combination, sufficient water to maintain the mud as a fluid, sufficient clayey material to form a filter cake on the wall of the well, and a water soluble ethyl lithium sulfoethyl cellulose in an amount sufficient to reduce the water loss due to filtration through said filter cake without increasing the viscosity of said well drilling mud to such an extent that it cannot be circulated.

14. A process for forming a filter cake, having a low rate of filtration of fluid therethrough, on the wall of a well by the deposition of colloidal clayey solids from a water base drilling mud circulated along said wall which comprises admixing with said drilling mud and interacting therewith a water soluble ethyl sulfoethyl cellulose selected from the group consisting of ethyl sulfoethyl cellulose and the water soluble inorganic salts thereof in an amount sufficient to decrease the rate of filtration of fluid through said filter cake but insufficient to increase the viscosity of said drilling mud to such an extent as to render it uncirculatable and then forming said filter cake from the resulting drilling mud.

15. A process for forming a filter cake, having a low rate of filtration of fluid therethrough, on the wall of a well by the deposition of colloidal clayey solids from a water base drilling mud circulated along said wall which comprises admixing with said drilling mud and interacting therewith a water soluble ethyl alkali metal sulfoethyl cellulose in an amount sufficient to decrease the rate of filtration of fluid through said filter cake but insufficient to increase the viscosity of said drilling mud to such an extent as to render it uncirculatable and then forming said filter cake from the resulting drilling mud.

16. A process for forming a filter cake, having a low rate of filtration of fluid therethrough, on the wall of a well by the deposition of colloidal clayey solids from a water base drilling mud circulated along said wall which comprises admixing with said drilling mud and interacting therewith a water soluble ethyl alkaline earth metal sulfoethyl cellulose in an amount sufficient to decrease the rate of filtration of fluid through said filter cake but insufficient to increase the viscosity of said drilling mud to such an extent as to render it uncirculatable and then forming said filter cake from the resulting drilling mud.

17. A process for forming a filter cake, having a low rate of filtration of fluid therethrough, on the wall of a well by the deposition of colloidal clayey solids from a water base drilling mud circulated along said wall which comprises admixing with said drilling mud and interacting therewith a water souble ethyl sodium sulfoethyl cellulose in an amount sufficient to decrease the rate of filtration of fluid through said filter cake but insufficient to increase the viscosity of said drilling mud to such an extent as to render it uncirculatable and then forming said filter cake from the resulting drilling mud.

18. A process for forming a filter cake, having a low rate of filtration of fluid therethrough, on the wall of a well by the deposition of colloidal clayey solids from a water base drilling mud circulated along said wall which comprises admixing with said drilling mud and interacting therewith a water soluble ethyl ammonium sulfoethyl cellulose in an amount sufficient to decrease the rate of filtration of fluid through said filter cake but insufficient to increase the viscosity of said drilling mud to such an extent as to render it uncirculatable and then forming said filter cake from the resulting drilling mud.

19. A process for forming a filter cake, having a low rate of filtration of fluid therethrough, on the wall of a well by the deposition of colloidal clayey solids from a water base drilling mud circulated along said wall which comprises admixing with said drilling mud and interacting therewith a water soluble ethyl magnesium sulfoethyl cellulose in an amount sufficient to decrease the rate of filtration of fluid through said filter cake but insufficient to increase the viscosity of said drilling mud to such an extent as to render it uncirculatable and then forming said filter cake from the resulting drilling mud.

20. The drilling mud composition of claim 5 wherein said ethyl sulfoethyl cellulose compound is a water soluble ethyl alkali metal sulfoethyl cellulose.

21. The drilling mud composition of claim 5 wherein said ethyl sulfoethyl cellulose compound is a water soluble ethyl alkaline earth metal sulfoethyl cellulose.

22. The drilling mud composition of claim 5 wherein said ethyl sulfoethyl cellulose compound is a water soluble ethyl potassium sulfoethyl cellulose.

23. The drilling mud composition of claim 5 wherein said ethyl sulfoethyl cellulose compound is a water soluble ethyl lithium sulfoethyl cellulose.

24. A process for forming a filter cake, having a low rate of filtration of fluid therethrough, on the wall of a well by the deposition of inorganic solids from a water base drilling mud circulated along said wall which comprises admixing with said drilling mud and interacting therewith a water soluble ethyl sulfoethyl cellulose selected from the group consisting of ethyl sulfoethyl cellulose and the water soluble inorganic salts thereof in an amount sufficient to decrease the rate of filtration of fluid through said filter cake but insufficient to increase the viscosity of said drilling mud to such an extent as to render it uncirculatable and then forming said filter cake from the resulting drilling mud.

25. The process of claim 24 wherein said water soluble ethyl sulfoethyl cellulose is a water soluble alkali metal sulfoethyl cellulose.

26. The process of claim 24 wherein said water soluble ethyl sulfoethyl cellulose is a water soluble ethyl alkaline earth metal sulfoethyl cellulose.

27. The process of claim 24 wherein said water soluble ethyl sulfoethyl cellulose is a water soluble ethyl sodium sulfoethyl cellulose.

28. The process of claim 24 wherein said water soluble ethyl sulfoethyl cellulose is a water soluble ethyl ammonium sulfoethyl cellulose.

29. The process of claim 24 wherein said water soluble ethyl sulfoethyl cellulose is a water soluble ethyl magnesium sulfoethyl cellulose.

30. The process of claim 24 wherein said water soluble ethyl sulfoethyl cellulose is a water soluble ethyl potassium sulfoethyl cellulose.

31. The process of claim 24 wherein said water soluble ethyl sulfoethyl cellulose is a water soluble ethyl lithium sulfoethyl cellulose.

32. The process of claim 15 wherein said water soluble ethyl alkali metal sulfoethyl cellulose is a water soluble ethyl potassium sulfoethyl cellulose.

33. The process of claim 15 wherein said ethyl alkali metal sulfoethyl cellulose is a water soluble ethyl lithium sulfoethyl cellulose.

VIRGIL SCARTH.

REFERENCES CITED

The following references are of record in the file of this patent:

UNITED STATES PATENTS

| Number | Name | Date |
|---|---|---|
| 2,425,768 | Wagner | Aug. 19, 1947 |